United States Patent [11] 3,617,546

[72] Inventors Norman N. Li
Edison;
Robert P. Cahn, Millburn; Adam L. Shrier,
Upper Montclair, all of N.J.
[21] Appl. No. 28,094
[22] Filed Apr. 13, 1970
[45] Patented Nov. 2, 1971
[73] Assignee Esso Research and Engineering Company

[54] REMOVAL OF ORGANIC COMPOUNDS BY
LIQUID MEMBRANE
13 Claims, No Drawings
[52] U.S. Cl. .................................................... 210/22,
210/23, 210/59
[51] Int. Cl. ......................................................... B01d 13/00
[50] Field of Search .......................................... 210/21–23,
28, 42, 59

[56] References Cited
UNITED STATES PATENTS
2,761,563  9/1956  Waterman et al. ............  210/21
2,773,027  12/1956  Powers .........................  210/21 X
3,389,078  6/1968  Elzinga et al. ................  210/21 X
3,410,794  11/1968  Li ..................................  210/21 X
3,446,732  5/1969  Gasser et al. ................  210/44
3,454,489  7/1969  Li ..................................  210/22
3,522,346  7/1970  Chang .........................  210/22 X Primary Examiner—Reuben Friedman
Assistant Examiner—Thomas G. Wyse
Attorneys—Chasan and Sinnock and Michael Conner ABSTRACT: Organic compounds are removed from waste water streams by treatment with an emulsion of aqueous droplets containing a reagent coated by an organic liquid membrane containing surfactants through which the organic compounds in waste water will permeate and react in the aqueous droplets to form new chemical compounds and from which they can be recovered eventually by flashing off or emulsion breakup. The formation of new chemical compounds in the aqueous droplets prevents the organic compounds from permeating out of the emulsion. In a preferred embodiment of the invention phenol is removed from waste water streams.

REMOVAL OF ORGANIC COMPOUNDS BY LIQUID MEMBRANE

BACKGROUND OF THE INVENTION

This invention pertains to a process for separating organic compounds from aqueous and nonaqueous streams. More particularly, this invention pertains to a process for separating organic compounds from waste water streams. The separation of such organic compounds is effected by treating the waste water with an emulsion of an aqueous solution containing a reagent in a nonaqueous surfactant solution, said surfactant solution forming a liquid membrane through which the organic compounds, e.g., phenol, will permeate. Within the droplet enclosed by the liquid membrane is a material which will react chemically with the organic compound, e.g., phenol, and thereby restrain it from leaving the droplet again. If phenol is utilized the material should be basic. Subsequently the compound may be removed by flashing, distillation, or by standard emulsion breakup techniques or disposed of by incineration.

A major pollution problem associated with industrial wastes is the phenol content of effluent water streams. The phenols result from cracking processes or partial oxidation techniques where there is a chance of aromatics and oxygen containing compounds reacting at elevated temperatures. Another source of phenol containing waste water streams in industry are those processes which use phenol as an extraction or extractive distillation solvent for the separation of hydrocarbon types. Phenols are often present in relatively large amounts which have presented some difficulty in effecting removal. The removal of these phenols has been difficult in the past because of the lack of suitable technology. One way of treating dilute phenol waters has been to feed them to secondary sewage treatment basins where appropriate micro-organisms can metabolize the phenols, provided the phenol content is low enough. However, at best this is a sensitive operation, even requiring occasional intentional phenol spills during times of low phenol emission in order to keep the microbial population in the sewage ponds properly balanced to handle phenolic waters. Moreover, in addition to its limited usefulness, biological oxidation is a relatively expensive process. More modern treatments require the extraction of the phenol with oil and then subjecting it to further processing. The solvent extraction approach has also proved to be inadequate due to its inability to provide reliable operation under commercial conditions which include wide variations in phenol content.

SUMMARY OF THE INVENTION

According to this invention, it has unexpectedly been discovered that a liquid membrane such as that disclosed in U.S. Pat. No. 3,454,489 may be utilized to separate organic compounds such as phenol from waste waters. The liquid membrane coats emulsion-size droplets which contain a material more basic than or acidic than the organic compound; in the event the organic compound id phenol, a strongly basic material would be used such as sodium hydroxide, ammonium hydroxide, lime, soda ash, potash, etc.

The organic compound, such as phenol, will permeate through the particular surfactant membranes utilized; these membranes are liquid surfactant membranes formed from a solution of oil-soluble surfactant membranes formed from a solution of oil-soluble surfactants in an organic compound which is immiscible with the aqueous stream being treated and also immiscible with the aqueous solution contained therein in the form of droplets. Preferably, the solubility of the membrane materials in the aqueous phases should be very low to prevent losses and contamination.

Surfactants are surface active agents having hydrophobic and hydrophilic ends. In the previously mentioned application, the surfactant membranes were utilized only as a separation device; that is to say, the individual droplets did not contain chemicals which would react with the permeating compound and thereby hold it within the droplets. According to this invention, it has been discovered that compounds which pollute aqueous or nonaqueous solutions, such as phenol, may be removed very rapidly and efficiently by forming a new compound from the contaminant and a chemical contained within the liquid membrane droplets, said new compound being incapable of permeating back out through the membrane.

In more detail the instant invention pertains to the separation of organic compounds dissolved in waste water streams. The organic compounds and solid materials which are not dissolved in water but form colloidal suspension or emulsions with water can be removed from waste water streams by adsorption on the absorption in the liquid membranes, in the same operation which removes the dissolved organic materials.

In particular phenol, higher phenol, acetic acid, formic acid and amines are contaminants which are to be removed from water streams. These materials are capable of dissociating in aqueous solution to form $H^+$ or $(OH)^-$ ions, and have an appreciable solubility in organic solvents. These contaminants tend to be present in waste water streams in amounts of 1 p.p.m. to 10,000 p.p.m., or more, usually about 50 p.p.m. to 500 p.p.m. Typically, these streams are present in refinery effluents, but then they will also be released from chemical plants which produce, for example, oxygenated compounds by partial oxidation of hydrocarbons, pulp and paper mills, food processing plants, drug manufacturing facilities, and other process industries installations.

The process of the instant invention facilitates the removal of the contaminants such as phenol from waste water streams. To accomplish this removal, the streams must be contacted within an organic solvent with droplets coated by a liquid surfactant membrane. The organic solvent for the surfactant can be a saturated hydrocarbon having 5 or more carbon atoms/molecules, but with a preferred carbon number range from 20 to 40. Unlike previously utilized liquid membrane techniques, the droplets encompass a chemical which will react with the permeating compound; in the case of phenol removal, the chemical is basic. Any basic material, that is to say, any material having a pH above 7 may be utilized but the preferred bases are strong bases with pH higher than 10, such as sodium and potassium hydroxide or carbonate, calcium or magnesium hydroxide. The purpose of the base is to react with the acidic contaminant in the waste water stream. Thus, the typical contaminant such as phenol or acetic acid, for example, will pass through the liquid membrane and react with the base to form water and a slat, i.e., if the base is NaoH water and sodium phenolate or sodium acetate will be formed. The resulting products, i.e., water and salts, will stay entrained within the membrane and not pass out through the membrane because they have extremely low solubilities in the oil membrane.

The droplets which are coated with liquid oil surfactant membrane and contain a base in their interior are formed by slowly pouring basic aqueous solution into a surfactant solution while intensive mixing is applied. Stirring rates of about 300–1,200 r.p.m. are typical. Times of 10–500 minutes are acceptable. An emulsion containing droplets of the aqueous solution coated with the liquid membrane is made after mixing the entire aqueous solution of caustic in the surfactant solution. Besides stirring, other forms of dispersion, such as shearing, electrical dispersion, and ultrasonic vibration, may be used to form small emulsion size droplets.

In a typical laboratory run, an aqueous solution of caustic may be poured at a rate of about 10 cc./min. into 200 cc. of a surfactant solution at a mixing rate of about 500 r.p.m. The total mixing time for mixing the entire aqueous solution of caustic in the surfactant solution is about 10 minutes. The resulting droplets usually have a diameter of $10^{11}$ to $10^{15}$ cm., preferably $10^{13}$ to $10^{15}$ and most preferably, about $10^{15}$ cm.

A wide variety of different surfactants may be utilized; any of the various oil-soluble surfactants would be satisfactory.

Although it is preferred to use surfactants which are very oil-soluble and have structure-compatibility with the contaminants in waste water for high permeation rate of the contaminants, such as carbon ring structure in the surfactant for benzene removal.

Specifically, the various surfactant groups including the long chain polar surfactants, fluorohydrocarbon surfactants, silicones and miscellaneous surfactants such as polymeric surfactants may be utilized effectively in the instant invention. Naturally, particular groups will be preferred for a given separation. For instance, when removing phenol from a waste water stream the preferred surfactants are long chain fatty ester carbohydrates.

In general, the preferred surfactants which are to be utilized in the instant invention are the surfactants which aid in attracting permeates and therefore increasing transfer rate. Typical polar groups are COOH, OH, $NH_2$, $CONH_2$, SH, $SO_3H$, and salts of long chain carboxylic acids and sulfonates. The long chain polar surfactants include a wide range of compounds such as ethylene glycol polyethers, polyethyleneoxy ethanol, phosphate radical on polyethyleneoxy molecule. The latter is a weakly anionic surfactant.

Short chain fluorocarbons with polar groups are frequently sufficiently soluble in hydrocarbon oils to function as surfactants. Long chain fluorocarbons attached to a hydrocarbon chain of sufficient length are soluble in hydrocarbon oils.

Silicone oils differ broadly in their chemical structure and surface-active properties. Those of sufficiently small molecular weight to be soluble in the hydrocarbon solvent and containing $CH_3$ or other groups attached to silicon in the $(Si-O)_n$ skeleton can be expected to be surface-active.

The final overall grouping can best be called miscellaneous and includes a broad category of macromolecules and polymers such as fatty alcohols.

Since the number of surfactants is extremely large, it is not intended to burden this application with numerous examples. The following publications are herein incorporated by reference. Surface Chemistry by Lloyd I. Osipow, Reinhold Publishing Company, New York (1962) chapter 8 and Surface Activity, Moillet et al., Van Nostrand Company, Inc. (1961) Part III.

Typical surfactants that may be utilized with this invention include Igepal. This is a nonionic surfactant, nonylphenoxypolyethyleneoxy ethanol. It is a trademark of the General Aniline and Film Corporation and has the configuration $RC_6H_4O(CH_2CH_2O)_nCH_2CH_2OH$ where R may be $C_8H_{17}$, $C_9H_{19}$ or $C_{10}H_{21}$ and n varies from 1.5 to 100. Igepals with n values smaller than 8 are oil-soluble surfactants.

Span, a trademark of the Atlas Chemical Industries, is a series of surface active agents in the group of long-chain polar surfactants. Spans are also known as sorbitan fatty acid esters because they are fatty acid esters of anhydro sorbitols condensed with ethylene oxide.

Cellulose acetate, a member of the group of macromolecules and polymers is one of the cellulose esters of the organic acids. By the action of acetate anhydride on cotton in the presence of a little acid, cellulose acetate can be prepared. It has the formula

$$[C_{12}H_{14}O_4(OCOCH_3)_6]_n$$

and n will vary depending on the conditions utilized. It should be emphasized that the reagent within the droplet is in solution, preferably in aqueous solution, or readily available to go into solution, such as suspended $Ca(OH)_2$ which is slightly soluble in the aqueous phase. This is, of course, applicable to any other organic compound which is to be separated from an aqueous solution by the instant invention.

The waste water, containing the contaminant such as phenol is contacted with the emulsion of liquid membrane coated droplets within a separation zone. If desired, good dispersion of the emulsion in the water to be treated or vice versa may be maintained by the use of agitation. The preferred method of maintaining the dispersion is to agitate at a speed of 400 to 600 r.p.m. or higher for a period of about 5 to 20 minutes, preferably 10 to 15 minutes. Waste water to emulsion weight ratio usually varies from 1 to 200, depending on the reagent concentration used which can be present at any concentration, usually from 0.1 percent to 20 wt. percent and the rest of the drop is water and, perhaps, some additives for various different purposes. The agitation will serve to form the necessary emulsion within the separation zone. The separation zone may be any of the following: mixer, countercurrent or cocurrent spray tower or sieve-plate tower. It can also be packed column, a mechanical countercurrent contacting device such as a rotating disc contactor, or a centrifugal contactor. Countercurrent liquid-liquid mixer-settler stages with mechanical or orifice mixers can also be employed. If desired, multistage separation zones may be utilized, but it is possible that there will be sufficient separation of phenol in an initial stage so that further staging is not necessary. Typically, 1 to 2 stages will be utilized. Following the separation of the waste water and the passage of the contaminant, such as phenol, into the liquid membrane droplet the contaminant must be separated from the droplets. Within the droplets, contaminants react and in the case of phenol or acetic acid would form water and a salt, such as sodium phenolate or sodium acetate if the base is sodium hydroxide. In the case of other contaminants such as benzene, nitric acid or sulfonic acid may be used as the reagent to form nitrobenzene or benzenesulfonic acid. In the case of an amine, an acid reagent such as HCl would be entrained in order to form the amine hydrochloride salt.

Since these products will remain with the liquid membrane-coated droplets, a method is needed to remove the product and thereby recover the membrane for further treating. To separate the contaminant, after is has reacted with the base, the following procedure may be utilized; The emulsion is broken by any of the conventional demulsification methods, such as by heating or by adding a demulsifier. The surfactant solution recovered can then be reused. The aqueous solution recovered may be combined with an acid or base solution to neutralize the original reagent and to separate the contaminant. In the case of phenol removal, hydrogen chloride solution may be used to combine with the recovered aqueous solution to form sodium chloride and phenol. In this case the original reagent is recovered in the form of sodium chloride unless other processes are used to convert it to sodium hydroxide. $CO_2$ can also be used to spring phenols or other weak acids, such as "naphthenic acids" from their sodium salts. Weak bases, such as diethanolamines, or bicarbonates, can be employed utilizing the heat sensitive value of the compounds which they form with weak acids, such as $CO_2$ and $H_2S$. The liquid membrane, and the reagent which are recovered are then recycled back into the separation zones for further use. Alternatively, if desired, the entire emulsion may be discarded.

Another method of partial recovery of the spent emulsion is to vaporize the hydrocarbon portion of the emulsion for recycle, leaving the spent aqueous phase and oil-soluble emulsifier behind for discard.

A wide range of temperatures may be utilized in the process of the instant invention since temperature is not critical. There would, however, be a lower and an upper limit which would be satisfactory for separation with a liquid phase surfactant membrane. The lowest temperature should be higher than the freezing temperature of any of the liquids contacted, such as the waste water. It will also have to be higher than the freezing temperature of the emulsified aqueous mixture so that mass transfer will be facilitated. Since liquids membrane permeation rates increase with increasing temperature, as high a temperature as possible and economic should be employed. Typical temperatures would vary from 0° to 60° C., preferably 25° to 40° C. and would most preferably be ambient.

In the event that nonionic surfacts are utilized, the highest temperature should be lower than the precipitation temperature of the surfactant. If an ionic surfactant is to be used, the highest temperature is restricted by the boiling point of the surfactant solution. Of course, the temperature will have to be lower than the boiling point of the aqueous feed or the solvent. Thus, the temperature is to be regulated by the lowest boiling point of the elements in the separation at the pressure of the operation. It would be preferred to use ambient temperature since there is no additional expense in obtaining this level. Pressure is not critical and the most desirable pressure would be ambient, i.e., 1 atmosphere. Sufficient pressure will be needed to maintain all the elements of the separation, i.e., surfactant, solvent and aqueous mixture in the liquid phase, unless, as in the case of carbonate reagent, there is an evolution of $CO_2$ as the permeation progresses. The amount of surfactant to be added to the mixture which is to be separated may also vary within wide ranges. Typically, 0.05 to 2 weight percent of surfactant may be used, preferably 0.1 to 1.0 weight percent.

The permissible surfactant concentration will depend not only on the requirement that the membrane in the emulsion be stable, but on the solubility, i.e., potential loss of surfactant in the aqueous phase being treated. It should also be noted that if spent emulsion is discarded, as low a surfactant concentration as possible (0.1–0.2 percent) should be used, since the surfactant is usually the most expensive constituents of the emulsion. It should be emphasized that the base within the liquid membrane coated droplet is in solution which is preferably aqueous. Other solutions would be as follows: aqueous solutions of KOH, HCL, $H_2SO_4$, suspensions of $Ca(OH)_2$ $Mg(OH)_2$, solutions of $Na_2CO_3$, $Na_3BO_4$, etc.

In a preferred embodiment of the instant invention, a phenol containing waste water stream which contained about 50 to 1000 p.p.m. of phenol was treated. The stream was directed into a separation zone which was a mixer. Within the zone was an emulsion which was made by emulsifying an aqueous solution of NAOH in S100N containing Span 80, S100N is a heavy isoparaffinic oil with an average molecular weight of 368. The emulsion droplets were $10^{12}$ to $10^{14}$ cm. in diameter and contained an aqueous solution, the hydrocarbon in the amount of 100 to 200 g. and the sodium hydroxide in the amount of 0.05 to 20 g. The phenol containing waste water stream was continuously introduced into the zone. The zone was provided with a stirrer and was continually stirred at a rate of 100 to 200 r.p.m. Waste water was continuously removed from the separation zone and contained about 3 to 40 p.p.m. of phenol which represents a great reduction of phenol concentration. At another point in the separation zone, an emulsion of liquid-membrane coated droplets contained water and sodium phenolate was also removed. This emulsion was then treated by steam distillation to recover a separate stream of phenol as well as surfactant and its solvent. The surfactant and its solvent were recycled back into the separation zone.

SPECIFIC EMBODIMENTS

In the following examples, phenol was removed from waste water streams. The phenol was in an aqueous solution and was introduced into a separation zone which was a mixer. The zone was maintained at a temperature 25° C. and a pressure of 1 atmosphere. The experiment was conducted with a surfactant which was Span 80, a commercial name for sorbitan mono-oleate with a viscosity of 1000 cs. at 25° C. The surfactant was present in an amount of 2 percent by weight. The mixture of surfactant, sodium hydroxide, surfactant solvent which was S100N, a high molecular weight isoparaffin, and the phenol containing aqueous feed was mixed at a rate of 100 r.p.m. for about 50 minutes. The results and additional details of the experiment are included in table I. The feed recovered was analyzed by UV spectrography method for phenol concentration and by titration with acid for caustic concentration. The feed recovered under the run conditions described above was about 90 percent by weight. The loss of feed due to emulsification can be lowered by lowering the degree of mixing, concentration of surfactant and the ratio of surfactant solution to caustic solution in making the emulsion and also by using additives to form a tenacious membrane.

The table indicates that in Run 1 where there was no caustic added, a high phenol concentration remained after 43 minutes of agitation. Whereas in Run 2 where 0.4 weight percent of caustic was used, at the end of 19 minutes only 3 p.p.m. of phenol remained. In example 3 where the caustic concentration was increased slightly to 0.5 weight percent, phenol was reduced from 1,000 to 33 p.p.m. in just 53 minutes.

It should be noted that the Na content of the waste water rose very slowly, indicating very little permeation of Na-ion from the "inside" of the emulsion to the outside waste water stream.

TABLE.—EXPERIMENTAL PHENOL REMOVAL FROM WASTE STREAMS

| | Run Number | | |
|---|---|---|---|
| | 1 | 2 | 3 |
| Aqueous feed: | | | |
| Cc. | 250 | 250 | 250 |
| Phenol, p.p.m. | 1,000 | 200 | 1,000 |
| Emulsion: | | | |
| Membrane hydrocarbon. | S100N | S100N | S100N |
| Hydrocarbon, cc. | 200 | 200 | 200 |
| Surfactant. | (1) | (1) | (1) |
| Aquous phase, cc. | 100 | 96.8 | 97 |
| Caustic concentration, weight percent. | 0 | 0.4 | 0.5 |

| | Run data | | | | | | | |
|---|---|---|---|---|---|---|---|---|
| | Time, min. | Phenol, p.p.m | Percent, rem'd. | Time, min. | Phelol, p.p.m | Percent, rem'd. | Time, min. | Phenol, p.p.m | Percent, rem'd. |
| Feed | 0 | 990 | 0 | 0 | 200 | 0 | 0 | 1,000 | 0 |
| | 2 | 730 | 26 | 1 | 83 | 59 | 2 | 652 | 35 |
| | 5 | 667 | 33 | 2 | 60 | 70 | 5 | 288 | 71 |
| | 8 | 615 | 38 | 3 | 36 | 82 | 18 | 41 | 96 |
| | 23 | 606 | 39 | 5 | 17 | 92 | 38 | 44 | 96 |
| | 43 | 612 | 38 | 19 | 3 | 98 | 53 | 33 | 97 |
| | | | | | (2) | | | (3) | |

1 2% span 80.
2 No NaOH in aqueous phaes.
3 Na in final aqueous phase=43 p.p.m.

What is claimed is:

1. A process for separating an organic compound from a solution which comprises passing said solution into a contacting zone where it is contacted with an emulsion comprising droplets of a mixture comprising a second compound capable of reacting with said organic compound, said droplets being coated in the emulsion with a liquid surfactant containing membrane, said liquid surfactant being immiscible with said solution containing the organic compound and said mixture 4. The process of claim 1 wherein said second compound is a base.

5. The process of claim 1 wherein said second compound is sodium hydroxide.

6. The process of claim 1 wherein said surfactant is a long chain fatty ester.

7. A process for separating phenols from an aqueous solution which comprises passing said solution into a contacting zone where it is contacted with an emulsion comprising droplets of a mixture comprising a base capable of reacting with said phenols, said droplets being coated in the emulsion containing the second compound, said membrane being permeable to said organic compound, passing at least a portion of said organic compound through said liquid membrane to react with said second compound to form a third compound towards which said membrane is substantially nonpermeable, and recovering a solution depleted in said organic compound.

2. The process of claim 1 wherein said solution is an aqueous solution.

3. The process of claim 1 wherein said solution contains phenol as the organic compound.

with a liquid surfactant containing membrane, said liquid surfactant being immiscible with said solutions containing the phenols and said mixture containing the base, said membrane being permeable to said phenols, passing at least a portion of said phenols through said liquid membrane to react with said base to form a phenol salt compound towards which said membrane is substantially nonpermeable and recovering a solution depleted in said phenols.

8. The process of claim 7 wherein said surfactant is sorbitol mono-oleate.

9. The process of claim 7 wherein said base is sodium hydroxide.

10. The process of claim 7 wherein said droplets have a diameter of $10^{11}$ to $10^{15}$ inch.

11. The process of claim 7 wherein said mixture has a pH of at least 10.

12. The process of claim 7 wherein said surfactant contains a strong polar group.

13. The process of claim 7 wherein said surfactant is oil soluble.

* * * * *

UNITED STATES PATENT OFFICE
CERTIFICATE OF CORRECTION

Patent No. 3,617,546　　　　　　　　Dated　　November 2, 1971

Inventor(s)　Norman N. Li, Robert P. Cahn and Adam L. Shrier

It is certified that error appears in the above-identified patent and that said Letters Patent are hereby corrected as shown below:

Claim 1, column 6, after "mixture" in line 75 insert -- containing the second compound, said membrane being permeable to said organic compound, passing at least a portion of said organic compound through said liquid membrane to react with said second compound to form a third compound towards which said membrane is substantially nonpermeable, and recovering a solution depleted in said organic compound. --

Claim 7, column 7, after "emulsion" in line 11 cancel "containing the second compound, said membrane being permeable to said organic compound, passing at least a portion of said organic compound through said liquid membrane to react with said second compound to form a third compound towards which said membrane is substantially nonpermeable, and recovering a solution depleted in said organic compound." and insert --with a liquid surfactant containing membrane, said liquid surfactant being immiscible with said solutions containing the phenols and said mixture containing the base, said membrane being permeable to said phenols, passing at least a portion of said phenols through said liquid membrane to react with said base to form a phenol salt compound towards which said membrane is substantially nonpermeable and recovering a solution depleted in said phenols. --

Column 8, cancel lines 1-8 "with a liquid surfactant containing membrane, said liquid surfactant being immiscible with said solutions containing the phenols and said mixture containing the base, said membrane being permeable to said phenols, passing at least a portion of said phenols through said liquid membrane to react with said base to form a phenol salt compound towards which said membrane is substantially non-permeable and recovering a solution depleted in said phenols."

Signed and sealed this 18th day of December 1973.

(SEAL)
Attest:

EDWARD M.FLETCHER,JR.　　　　　RENE D. TEGTMEYER
Attesting Officer　　　　　　　　Acting Commissioner of Patents